(12) United States Patent
Chow

(10) Patent No.: US 8,036,954 B2
(45) Date of Patent: *Oct. 11, 2011

(54) CUSTOMER-SPECIFIC MERCHANDISING PROGRAM

(75) Inventor: Terry Chow, Toronto (CA)

(73) Assignee: Mars, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,127

(22) Filed: Sep. 25, 2009

(65) Prior Publication Data

US 2010/0036714 A1    Feb. 11, 2010

Related U.S. Application Data

(63) Continuation of application No. 11/431,862, filed on May 11, 2006, now Pat. No. 7,596,517, which is a continuation of application No. 10/155,072, filed on May 28, 2002, now Pat. No. 7,092,903.

(60) Provisional application No. 60/294,881, filed on May 31, 2001.

(51) Int. Cl.
   *G06Q 30/00*    (2006.01)
(52) U.S. Cl. ............ 705/27.2; 705/27.1; 705/26.1; 705/26.5; 705/26.8; 705/26.81
(58) Field of Classification Search .......... 705/26, 705/27, 26.1, 26.5, 26.61, 26.8, 26.81, 26.82, 705/27.1, 27.2
   See application file for complete search history.

(56) References Cited

U.S. PATENT DOCUMENTS

| | | | |
|---|---|---|---|
| 5,045,328 A | 9/1991 | Lewis et al. | 426/28 |
| D352,619 S | 11/1994 | Pigott et al. | D6/467 |
| 5,845,824 A | 12/1998 | Weimer et al. | 222/641 |
| 5,876,212 A * | 3/1999 | Hartung | 434/207 |
| 5,897,005 A | 4/1999 | Bernens et al. | 211/189 |
| 5,970,471 A | 10/1999 | Hill | 705/26 |
| 5,970,473 A * | 10/1999 | Gerszberg et al. | 705/26 |
| 6,002,855 A | 12/1999 | Ladner et al. | 703/1 |
| 6,147,686 A | 11/2000 | Brown et al. | 345/839 |

(Continued)

FOREIGN PATENT DOCUMENTS

EP    0 678 422 A2    10/1995

(Continued)

OTHER PUBLICATIONS

Brochure: "TOPS® Total Optimization Packaging Software," TOPS Engineering Corporation, Plano, Texas (6 pages, no date available).

(Continued)

*Primary Examiner* — Nicholas D Rosen

(74) *Attorney, Agent, or Firm* — Fitzpatrick, Cella, Harper & Scinto

(57) ABSTRACT

The invention is directed to facilitating the planning and ordering of a merchandising unit and associated products. A merchandising unit planning screen is presented that displays a representation of a merchandising unit having holders for holding and displaying the products. A product menu is provided for each holder to allow selection of a product from a set of products for each respective holder. Available choices in the product menu of at least one holder are constraining to a subset of the set of products based on predetermined criteria. For each holder for which a product has been selected, a product quantity is determined based on a capacity of the respective holder. An order is generated based on the selected products.

23 Claims, 11 Drawing Sheets

U.S. PATENT DOCUMENTS

| | | | |
|---|---|---|---|
| 6,349,300 B1 * | 2/2002 | Graf et al. | 1/1 |
| 6,615,092 B2 * | 9/2003 | Bickley et al. | 700/99 |
| 6,785,805 B1 | 8/2004 | House et al. | 713/1 |
| 7,092,903 B2 * | 8/2006 | Chow | 705/27 |
| 7,596,517 B2 * | 9/2009 | Chow | 705/27 |
| 2002/0035507 A1 | 3/2002 | Singh | 705/14 |
| 2002/0042755 A1 | 4/2002 | Kumar et al. | 705/26 |
| 2002/0099625 A1 | 7/2002 | O'Brien | 705/27 |
| 2002/0133433 A1 | 9/2002 | Hall | 705/27 |
| 2003/0065590 A1 | 4/2003 | Haeberli | 705/27 |

FOREIGN PATENT DOCUMENTS

| | | |
|---|---|---|
| JP | 10-105625 A | 4/1998 |
| WO | WO 9515533 A1 | 6/1995 |

OTHER PUBLICATIONS

Brochure: "MaxLoad™," TOPS Engineering Corporation, Plano, Texas, (2 pages, no date available).

Brochure: "The Pkg™ Design Advantage," Design Axis, Inc., San Jose, CA, (1 page, no date available).

Brochure: "The Most Flexible, Easy-to-Use Packaging Design Software on the Market," Design Axis, Inc., San Jose, CA, and TOPS Engineering Inc., Plano TX, 1993 (1 page).

Printout from website: Welcome to CAPE Systems, CAPE Systems, Inc., Allen, TX, http://www.capesystems.com/, downloaded May 3, 2002 (5 pages).

Printout from website: WinSPEX Manufacturing Specification Software, Mountain Systems, Inc., Green Bay, WI, http://www.sarbrook.com/, downloaded May 3, 2002 (6 pages).

Fingleton, E., "Knocking off Head & Shoulders," Forbes, vol. 129, No. 12, pp. 162-164 (Abstract only), Jun. 7, 1982.

Gaines, L., "Chesapeake Packaging Co. Offers Recycled Corrugated Product," Kentucky Manufacturer, vol. 9, No. 5, S. 1, p. 16, May 1992.

Anon., "Sourcebook '96," Progressive Grocer Sourcebook, pp. Cover-48, Dec. 1995.

Anon., "Consolidated Papers, Inc., Reports Year-End and Fourth Quarter Results," News Release, Jan. 20, 1997.

Anon., "Spaceman Viewer Launched: Software Allows Critical Store-Level Feedback on Merchandising Plans," vol. 76, No. 9, p. A2, Sep. 1997.

Anon., "Charter Medical," BioPharm, vol. 14, No. 5, p. 81.

Gaffney, Michael., "Pkg.™ Provides Full-Contact Package Design," Paperboard Packaging, Aug. 1997 (4 pages).

Deierlein, "Good Specs: The Key to Long Trailer Life and High Disposal Value," Fleet Equipment, vol. 22, No. 7, pp. 40-44, Jul. 1996.

Rekus, J.F., "Burning Issues about Flammable Liquid Storage," Occupational Hazards, vol. 59, No. 11, pp. 27-32, Nov. 1997.

Anon., "The New Marketing Frontier," Building Supply Home Centers, vol. 162, No. 1, p. 56, Jan. 1992.

Thayer, W., "Planogram Problems? Beware the 'Quick Fix'," Frozen Food Age, Vo. 44, No. 3p, p. 1, Oct. 1995.

Ody, P., "Survey—FT IT: Retailers Jump on the Loyalty Bandwagon," Financial Times, Survey London Edition, 1 ED, p. 7, Oct. 2, 1996.

* cited by examiner

FIG. 5
Effem Inc. - Customer Specific Merchandising Program
Confectionery
-  Chocolate - Singles
-  Chocolate / Sugar - Singles
-  Chocolate / Sugar - King Size
-  Peg - Chocolate
-  Peg - Chocolate / Sugar
-  Peg - Sugar   **NEW - STARBURST® Sour Jellybeans 151g
-  Promotional Packs
-  Racks
-  Savory
-  Seasonal
-  Special Packs
-  Sugar

FIG. 7

Effem Inc. - Customer Specific Merchandising Program     WAL-MART

TRAY DESIGN

| 1 | 3 |
|---|---|
|   | 4 |
| 2 | 5 |
|   | 6 |

| Product Name | Count |
|---|---|
| MARS® Bar 58g | 48 |
| SNICKERS® Bar 59g | 48 |
| TWIX® Cookie Bar 57g | 36 |
| M&M's® Plain Chocolate 48g | 24 |
| M&M's® Peanut Chocolate 49g | 24 |
| M&M's® Crispy Chocolate 42g | 24 |
| BOUNTY® Bar 57g | 36 |
| DOVE® Caramel 48g | 36 |
| SKITTLES® Fruit 61g | 36 |
| SKITTLES® Tropical 61g | 36 |
| SKITTLES® Wildberry 61g | 36 |
| SKITTLES® Sours 51g | 36 |

Display Type
Prepack
Half Pallet - 4 Layer
Half Pallet - 5 Layer
Half Pallet - 6 Layer
Full Pallet - 4 Layer
Full Pallet - 5 Layer
Full Pallet - 6 Layer

| Customer Selection Menu | |
|---|---|
| Brand Selection | |
| 1 | M&M's Plain Chocolate |
| 2 | M&M's Peanut Chocolate |
| 3 | SKITTLES Fruit |
| 4 | MARS Bar |
| 5 | MARS Bar |
| 6 | TWIX Cookie Bar |
| | |
| Display Type | Prepack |

[View] TO VIEW ORDER     [Review] TO VIEW SELL SHEET

[Clear] TO CLEAR

[Accept] TO ACCEPT ORDER

[Print] TO PRINT ORDER

ORDER DETAILS

DATE: April 25, 2002           QUANTITY ORDERED:
SHIP DETAILS: Direct           CUSTOMER NO.:
BILL TO:                       SHIP TO:

Wholesaler Name, Address       Customer Name, Address

FIG. 9

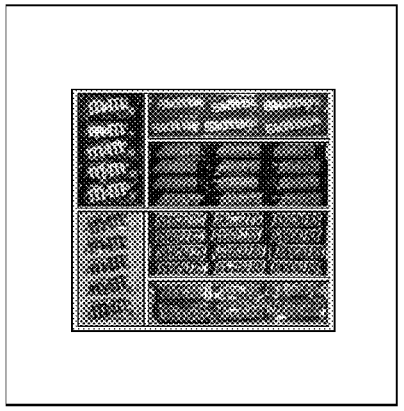
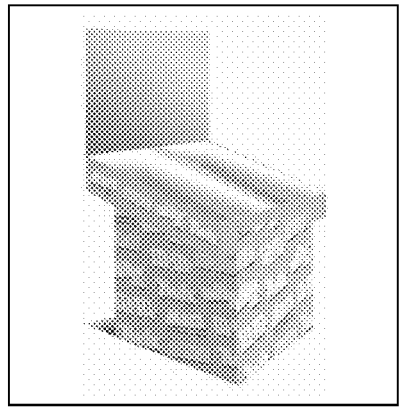

216-PC CHOCOLATE/SUGAR PREPACK

| TRAY | | |
|---|---|---|
| QTY | ITEM | PRODUCT UPC 58496 |
| 48 | MARS® Bar 58g | 81458 |
| 48 | SNICKERS® Bar 59g | 81459 |
| 36 | TWIX® Cookie Bar 57g | 81123 |
| 36 | SKITTLES® Fruit 61g | 82960 |
| 24 | M&M's® Plain Chocolate 48g | 81231 |
| 24 | M&M's® Peanut Chocolate 49g | 81232 |
| 24 | M&M's® Peanut Chocolate 49g | 81232 |

| CASE SIZE | | |
|---|---|---|
| SCC-14 | | |
| | METRIC CM | IMPERIAL INCHES |
| LENGTH | 61.0 | 24.02 |
| WIDTH | 50.8 | 20.00 |
| HEIGHT | 17.4 | 6.85 |
| WEIGHT (approx.) | 15.456 KG | 34.08 LBS |
| DISPLACEMENT | 0.054 M³ | 1.904 FT³ |

| PALLET SIZE | | |
|---|---|---|
| SCC-14 | | |
| | METRIC CM | IMPERIAL INCHES |
| LENGTH | 121.9 | 121.9 |
| WIDTH | 101.6 | 101.6 |
| HEIGHT | 142.2 | 142.2 |
| WEIGHT (approx.) | 525.056 KG | 1157.54 LBS |
| DISPLACEMENT | 1.762 M³ | 1019.520 FT³ |
| CASES/LAYER (Tie) | 4 | |
| LAYERS/PALLET (Tier) | 8 | |
| CASES/PALLET | 32 | |

| TERMS & CONDITIONS | | |
|---|---|---|
| CARRIER'S NAME | | BASE INVOICE PRICE |
| DELIVERED | | TERMS OF PAYMENT | 2% | 10 DAYS / NET 30 DAYS |

FIG. 11

Effem Inc. - Customer Specific Merchandising Program — WAL-MART

1728-PC CHOCOLATE/SUGAR 4-LAYER HALF PALLET

TRAY
PRODUCT UPC 58496

| QTY | ITEM | |
|---|---|---|
| 48 | MARS® Bar 58g | 81458 |
| 48 | SNICKERS® Bar 59g | 81459 |
| 36 | TWIX® Cookie Bar 57g | 81123 |
| 36 | SKITTLES® Fruit 61g | 82960 |
| 24 | M&M's® Plain Chocolate 48g | 81231 |
| 24 | M&M's® Peanut Chocolate 49g | 81232 |

CASE SIZE
SCC-14

| | METRIC CM | IMPERIAL INCHES |
|---|---|---|
| LENGTH | | 0.00 |
| WIDTH | | 0.00 |
| HEIGHT | | 0.00 |
| WEIGHT (approx.) | KG | 0.00 LBS |
| DISPLACEMENT | 0.000 M³ | 0.000 FT³ |

PALLET SIZE
SCC-14

| | METRIC CM | IMPERIAL INCHES |
|---|---|---|
| LENGTH | 121.9 | 121.9 |
| WIDTH | 101.6 | 101.6 |
| HEIGHT | 142.2 | 142.2 |
| WEIGHT (approx.) | 131.464 KG | 289.83 LBS |
| DISPLACEMENT | 1.762 M³ | 1019.520 FT³ |
| CASES/LAYER (Tie) | 2 | |
| LAYERS/PALLET (Tier) | 4 | |
| CASES/PALLET | 8 | |

TERMS & CONDITIONS

| CARRIER'S NAME | | BASE INVOICE PRICE | | |
|---|---|---|---|---|
| DELIVERED | | TERMS OF PAYMENT | 2% | 10 DAYS / NET 30 DAYS |

CUSTOMER-SPECIFIC MERCHANDISING PROGRAM

CROSS-REFERENCE TO RELATED APPLICATIONS

This application is a continuation of U.S. patent application Ser. No. 11/431,862, filed May 11, 2006, which is a continuation of U.S. patent application Ser. No. 10/155,072, filed May 28, 2002, now U.S. Pat. No. 7,092,903, which issued on Aug. 15, 2006, and which claims the benefit of U.S. Provisional Patent Application No. 60/294,881, filed May 31, 2001. The entire contents of these prior applications are hereby incorporated by reference herein.

BACKGROUND OF THE INVENTION

1. Field of the Invention

The present invention relates to systems, methods, and computer code for allowing a customer to plan and order a product from a vendor.

2. Description of the Related Art

Many vendors sell products using a sales force including account managers that handle specific customers. In addition to handling regular sales, the account manager may plan a promotional program in cooperation with the customer to promote certain products.

For example, the customer, such as a large discount store, may have sales data indicating that certain types of confectionery products, e.g., chocolate singles, experience increased sales in the back-to-school season. Based on such data, the customer and account manager may agree that promotional displays containing chocolate singles should be placed in aisles in which school supplies are displayed during the back-to-school season.

The customer, in consultation with the account manager, may select a particular type of display and particular brands of confectionery products for the promotional program using a catalog. The number of possible combinations of displays and brands typically is limited. In many cases, the customer may request to create a new configuration of display and product that is not provided in the catalog.

The account manager and the customer then discuss the possible product mix within the context of the promotional program. Once the proposed product mix is established, the account manager must take a number of steps to determine whether the promotional program meets various business and/or practical considerations. For example, the account manger must determine whether the proposed product order would be economic or whether it would be desirable for other reasons, such as for marketing purposes.

The account manager submits the proposed promotional program to a formal approval process. The approval process provides preliminary cost estimates and time-lines for delivery of the promotional program. The approval process takes into account the ability of suppliers, packers, and shippers to fill the proposed product order within the proposed time frame. If the proposed promotional program does not meet established business requirements or is not practical within the proposed time frame, the account manager may be given several alternative product mix and/or display configurations to consider. The account manager then has to consult with the customer to determine which alternative product mix and/or display configuration is acceptable.

Once the account manager and the customer have agreed on a promotional program, the account manager must submit the program to an implementation approval process. The implementation approval process includes the creation of a sell sheet based on the display type and product brands selected. The sell sheet provides specific product information, such as quantity and weight, and other information, such as shipping weight and a universal product code (UPC). The sell sheet data may be input by the customer into a product receiving system to facilitate receipt of the promotional product.

The process for planning and executing the sale of the vendor's products for a promotional program, as described above, may take as long as 20 weeks, or perhaps longer. Consequently, promotional programs that are not planned with sufficient lead time may miss the targeted sales period. Moreover, it is not possible under such a regime to respond spontaneously to changing consumer demand and/or marketing conditions.

Software packages are available to assist in shipping merchandise orders that have been planned using conventional approaches. For example, programs such as TOPS® (produced by Tops Engineering Corp., Plano, Tex.) and CAPE® (produced by Cape Systems, Inc., Allen, Tex.) may be used to determine pallet patterns and efficiencies for shipping packages. These programs also provide technical data, such as shipping size and weight, and can display graphic images of pallet arrangements. Other software packages, such as Pkg™ (produced by Design Axis, Inc., San Jose, Calif.) and WinSPEX™ (produced by Mountain Systems, Inc., Green Bay, Wis.), provide database systems to assist in managing packaging specifications. However, these conventional software tools merely assist in planning the shipment of predetermined combinations of merchandise and therefore do not address the problems associated with the merchandising program planning cycle.

In view of the various shortcomings of the methods and tools for planning and ordering products discussed above, there is a need for a merchandising program that overcomes the drawbacks of these conventional approaches.

SUMMARY OF THE INVENTION

The present invention generally provides a system, method, and computer code for customer-specific merchandising of products.

One aspect of the invention provides a system, method, and computer code for facilitating the planning and ordering of a merchandising unit and associated products. A merchandising unit planning screen is presented that displays a representation of a merchandising unit having holders for holding and displaying the products. A product menu is provided for each holder to allow selection of a product from a set of products for each respective holder.

Available choices in the product menu of at least one holder are constrained to a subset of the set of products based on predetermined criteria. For each holder for which a product has been selected, a product quantity is determined based on a capacity of the respective holder. An order is generated based on the selected products.

Embodiments of the present invention may include one or more of the following features. The predetermined criteria may include an availability for shipment of each product within a selected time period for the product quantity. Each product that is not available for shipment within the selected time period may be excluded from the subset of the set of products.

The predetermined criteria may include a profitability of each product for the product quantity. Each product for which the profitability is below a threshold may be excluded from the subset of the set of products.

The criteria may include the selected product of at least one other holder. The selected product of the at least one other holder may be excluded from the subset of the set of products. The predetermined criteria may include a marketing goal for each product. The predetermined criteria may be established on a customer-specific basis. The predetermined criteria may be based on geographic sales data.

A total product quantity may be determined for each selected product based on the product quantity for each holder. A list of the selected products may be displayed with the corresponding total product quantity for each selected product. Shipping size and weight information may be generated for the merchandising unit.

A sell sheet may be generated providing the list of the selected products with the corresponding total product quantity for each selected product, shipping size and weight information for the merchandising unit, and a universal product code. An estimated shipping date may be determined for the merchandising unit. A schedule may be generated providing a representation of a sales period of the selected products.

An image of the merchandising unit may be generated having images of the selected products for each respective holder. An image of a display unit may be generated showing the merchandising unit positioned in the display unit.

Another aspect of the present invention provides a system, method, and computer code for customer-specific merchandising of products. A merchandising unit planning screen is presented for a merchandising unit having holders for holding and displaying the products. A product menu is provided for each holder to allow selection of a product from a set of products for each respective holder.

Available choices in the product menu of at least one holder are constrained to a subset of the set of products based on predetermined criteria that include an availability for shipment of each product within a selected time period for the product quantity or that include the selected product of at least one other holder. For each holder for which a product has been selected, a product quantity is determined based on a capacity of the respective holder. An order is generated based on the selected products.

Another aspect of the present invention provides a system, method, and computer code for customer-specific merchandising of products. A merchandising unit is defined having holders for holding and displaying products. Products are selected for each holder to form combinations of selected products for the merchandising unit. The combinations of selected products are evaluated based on predetermined criteria to determine whether each of the combinations meets the predetermined criteria.

A merchandising unit planning screen having a product menu for each holder is presented to a customer to allow the customer to select a product for each respective holder to form a customer-selected combination. The customer is prevented from selecting a combination that does not meet the predetermined criteria. An order is generated based customer-selected combination.

Embodiments of the present invention may include one or more of the following features. The customer may be prevented from selecting a combination that does not meet the predetermined criteria by prompting the customer to change a selected product. The customer may be prevented from selecting a combination that does not meet the predetermined criteria by constraining available choices in the product menus.

The predetermined criteria may include an availability for shipment of the selected products. The predetermined criteria may include a profitability of the selected products.

Another aspect of the present invention provides a system for facilitating the planning and ordering of a merchandising unit and associated products. The system includes a presentation module for presenting to a client computer a merchandising unit planning screen that displays a representation of a merchandising unit having holders for holding and displaying the products. A menu module provides a product menu for each holder to allow selection of a product from a set of products for each respective holder. A product choice limitation module constrains available choices in the product menu of at least one holder to a subset of the set of products based on predetermined criteria. A quantity determination module determines, for each holder for which a product has been selected, a product quantity based on a capacity of the respective holder. An order generation module generates an order based on the selected products.

Another aspect of the present invention provides a method, system, and computer code for facilitating the customization of a merchandising unit and the planning and ordering of the merchandising unit and associated products. A merchandising unit, which has holders for holding and displaying the products, is customized using a merchandising unit design screen that allows the dimensions of the merchandising unit and the holders to be specified. A product menu is specified for each holder to allow selection of a product from a set of products for each respective holder. Available choices in the product menu of at least one holder is constrained to a subset of the set of products based on predetermined criteria.

These and other objects, features and advantages will be apparent from the following description of the preferred embodiments of the present invention.

BRIEF DESCRIPTION OF THE DRAWING

The present invention will be more readily understood from a detailed description of the preferred embodiments taken in conjunction with the following figures.

FIG. 5 shows an example of a product sub-category selection screen for the selected product category.

FIG. 7 shows an example of a merchandising unit planning screen with products selected for each compartment of the merchandising unit.

FIG. 9 shows an example of a sell sheet that provides product quantity and shipping information for a prepack display unit.

FIG. 11 shows an example of a sell sheet that provides product quantity and shipping information for a half pallet display unit.

DETAILED DESCRIPTION OF THE INVENTION

The Customer-Specific Merchandising Program (CSMP) is a computer-based system that allows a customer to plan and order a product from a vendor. For example, a customer may plan and order a product for a promotional program, such as a seasonal candy display. Another example would be a wire rack or shelf display of products, such as confectionery items, food, and pet care products.

Figure 1:
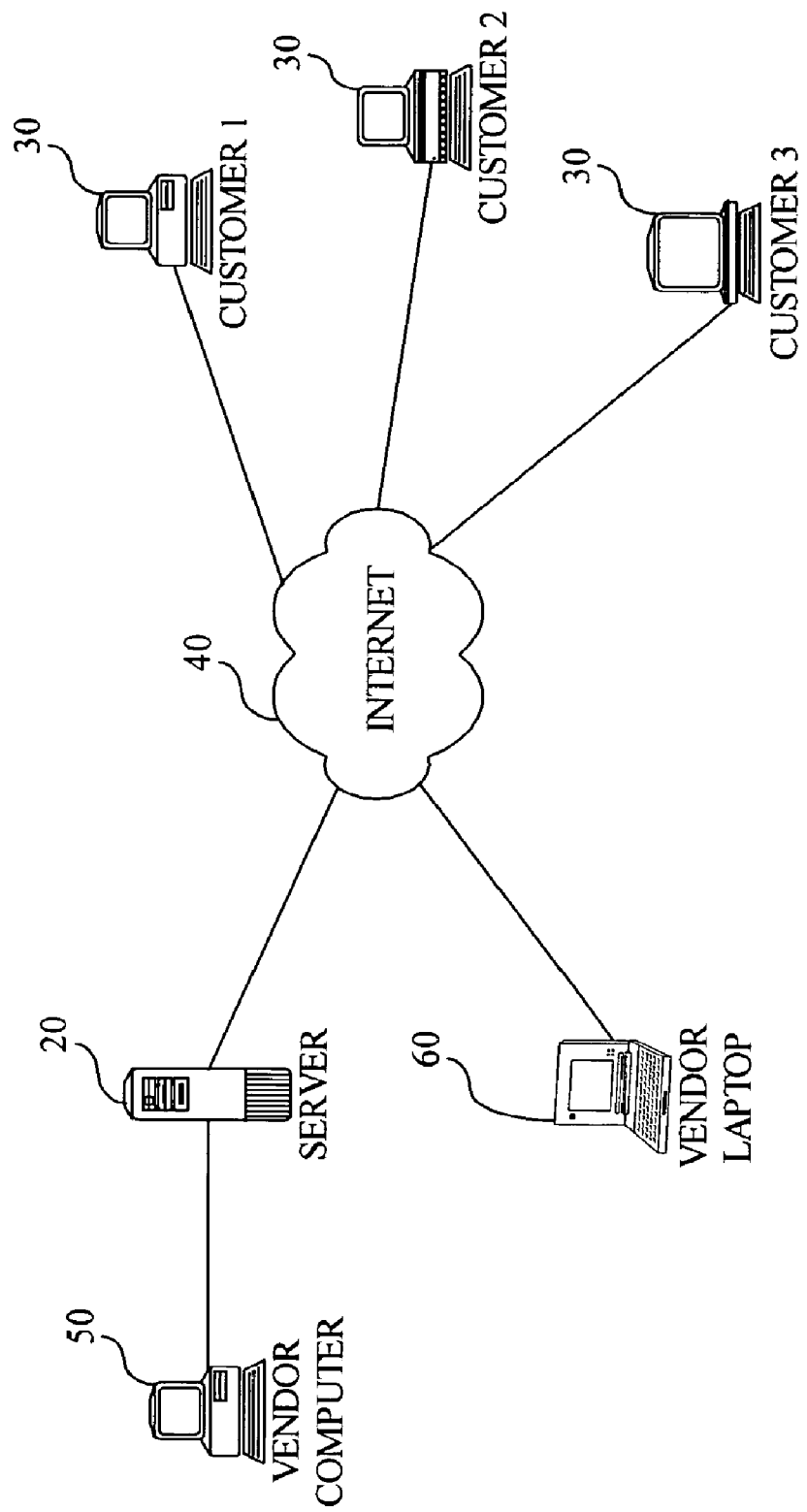
FIG. 1 is a block diagram of a vendor web server connected to customer computers through the Internet to implement a customer-specific merchandising program.

As shown in FIG. 1, the vendor may run the CSMP on a web server 20 configured to allow customers 30 to access the CSMP through the Internet 40. The vendor and/or the vendor's representatives may access the CSMP through the Internet 40 or through an internal network using a computer, such as a personal computer (PC) 50, or a portable computer, such as a laptop computer 60.

Figure 2:
FIG. 2 shows a log-in screen that allows a customer to access the customer-specific merchandising program.
Figure 3:
FIG. 3 shows the log-in screen of FIG. 2 with an example of customer log-in information including a customer login name and a product category selection.

As shown in FIGS. 2 and 3, the customer accessing the CSMP is connected to an Internet Web site. The Web site serves a login screen having a form with a field for inputting a customer login name. The form also may have a separate field for a password.

The form has a category selection field, which allows selection via a pull-down menu of a particular product category, e.g., confectionery, foods, and petcare. The product category determines the type of products that will be offered for inclusion in a merchandising unit. For example, selecting the category "confectionery", as shown in FIG. 3, allows the customer to plan and order a merchandising unit containing various candy products. After selecting the product category, the customer clicks on the "enter" button to advance to the next screen.

Figure 4:
FIG. 4 shows a promotional program scheduling screen generated by the customer-specific merchandising program.

The Web site verifies the customer's login information and serves a promotional program scheduling screen, as shown in FIG. 4., that provides a graphical representation of the promotional programs scheduled for the customer in the selected product category. The screen may be specific to the particular customer accessing the Web site, e.g., Wal-mart®, and may be customized with the customer's logo (all of the screens following the login screen may be similarly customized).

The promotional program schedule screen provides a time line for a particular period, e.g., one year, in which various product promotions may be scheduled. The time line may be divided into sections for various types of promotions, e.g., impulse, future, and seasonal.

For example, seasonal promotions are scheduled according to holiday periods, e.g., Valentine's Day, Easter, Summer, Halloween, and Christmas. Future promotions may be scheduled to introduce new products. Impulse promotions may be scheduled to promote certain types of candy configurations, such as singles.

The promotional programs may be scheduled according to dates or seasons selected by the customer. However, the dates or seasons available for a particular promotion may be limited according to predetermined criteria. For example, certain confectionery products may be specifically planned for certain holidays, such as Christmas candy canes or Valentine's Day, heart-shaped candy. The customer may be limited to certain dates or seasons for promotional programs including these holiday-specific products.

In addition to the predetermined criteria, the dates or seasons available for a promotional program may be limited according to certain factors determined during the ordering process. For example, an estimated shipping date may be computed following selection of the products to be included in the promotion, in which case the customer would be limited to dates subsequent to the estimated shipping date.

Each promotional program is represented by a button on the promotional program schedule screen. The customer clicks on a button to view detailed information on the promotional program, such as a sell sheet, as described below. Alternatively, each button may present a list of promotional programs that have been previously planned by the customer's management organization. The customer clicks on the individual programs in the list to view detailed information and selects the programs from the list in which the customer wishes to participate. In such a case, the promotional programs planned by the customer primarily serve to augment the programs previously planned by the management organization. This allows the management organization to maintain more uniformity in promotional program planning.

After reviewing the promotional program schedule screen, the customer clicks on the enter button to proceed to the next screen. As shown in FIG. 5, the promotional program schedule screen may be followed by a menu screen that allows selection of the product sub-category from within the selected product category. For example, within the confectionery product category, there may be a number of subcategories, e.g., chocolate singles, chocolate/sugar singles, peg chocolate, peg chocolate/sugar, etc. The customer clicks on the button for the particular sub-category of interest, e.g., chocolate/sugar singles, and the Web site serves the next screen (a number of such menu screens may be provided by the Web site at this point to allow selection of various product parameters).

Figure 6:
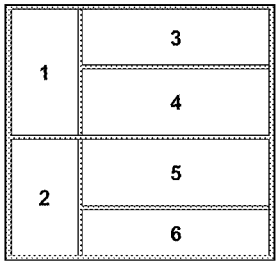
FIG. 6 shows an example of a merchandising unit planning screen.

As shown in FIGS. 6 and 7, the Web site serves a merchandising unit planning screen. The merchandising unit is a structural component used to ship and/or display the merchandise in the customer's store. The merchandising unit may be, for example, a wire rack or shelves on which the product will be displayed in the customer's store (in which case the product may be packed in boxes for shipment and loaded onto the merchandising unit at the customer's store). Alternatively, the merchandising unit may be used for both shipment and display of the product, such as a prepack.

The customer may customize certain aspects of the merchandising unit planning screen.

For example, the program may allow the customer to select the number of compartments to be incorporated in a predetermined or standard-sized merchandising unit. The program then would generate an outline drawing of the merchandising unit with the selected number of compartments.

The vendor or a merchandising designer may customize the merchandising unit planning screen prior to use by the customer according to the specifications of the particular merchandising unit to be used. For example, the program may provide an merchandising unit design screen in which the designer enters the dimensions of the merchandising unit and the number and dimensions of the compartments contained in the merchandising unit.

To facilitate the customization of the merchandising unit planning screen by the designer, the program may limit the dimensions of the merchandising unit to standard values, e.g., dimensions that would allow a number of merchandising units to fit on a standard-sized pallet without leaving a void. The dimensions of the standard shipping medium may be input by the designer. The program then may generate an outline drawing of the merchandising unit based on the designer's input. The program also may allow the designer to manipulate lines and geometric shapes displayed on the screen to form graphically an outline drawing of the merchandising unit. These features can make the program configurable to any sort of merchandising unit and shipping medium. Thus, the program can be customized for many different types of merchandising businesses and products.

In the case of chocolate/sugar singles, the merchandising unit may be a tray having compartments in which various candy and sugar products may be packed. The tray is used both for shipment and display of the products.

The merchandising unit planning screen shows an outline drawing of the tray divided into compartments of various sizes (the tray compartments may be numbered). Below the outline drawing of the tray is a customer selection menu that allows the customer to select the contents of each tray using pull-down menus. The merchandising unit planning screen also may provide information regarding the product count per tray for each brand and detailed order information.

The customer uses the customer selection menu to select specific products from the selected product category and sub-category to be placed in each compartment. In this example, the product category is confectionery and the sub-category is chocolate/sugar singles. Accordingly, pull-down menus are provided corresponding to each of the tray compartments.

The options available in each menu are limited to products within the selected product sub-category and may differ for each compartment. In this example, some of the menus are configured to provide chocolate singles brands, e.g., "SNICKERS®", "MARS® Bar", and "M&M's®", and other menus are configured to provide sugar singles brands, e.g., "SKITTLES® Fruit" and "SKITTLES® Wildberry". In an alternative example, if the customer had selected chocolate singles as the subcategory, then all of the menus would provide chocolate singles brands.

In one embodiment of the present invention, the brands offered in the menus may be limited by the product vendor based on various business considerations, such as profitability, shipment costs, prior sales history, inventory, manufacturing lead time, business goals, geographic or regional preferences, etc., and practical considerations, such as shipping weight, size, etc. The predetermined configuration of the menus by the product vendor allows the customer to have some choice in configuring the merchandising unit, but prevents the customer from selecting a combination of product brands that may be undesirable and/or uneconomic for the product vendor to provide.

For example, the menu for a particular compartment may only allow the selection of candy bars, due to a predetermined relationship between the size of the candy bars and the size of the compartment. The menu for a particular compartments may only allow the selection of various flavors of a new product that the vendor wishes to promote. A brand having a low profit margin may be offered only in a menu corresponding to a single compartment and/or a smaller compartment. The menus may be configured so that it is not possible to select the same brand for all of the compartments.

In addition to limiting the brands initially offered in the menus, as the customer makes selections in a particular menu, the program may adaptively modify the configuration of the remaining menus. For example, the menus for several compartments initially may be configured to offer "SNICKERS®" as a brand choice. However, if the customer selects "SNICKERS®" for Compartment 1 then the menus for the remaining compartments may be modified to remove "SNICKERS®" as a choice. This would prevent the customer from selecting "SNICKERS®" for more than one compartment. The adaptive modification of the menus, like the initial configuration, may be based on a various business and/or practical considerations.

Alternatively, the program may analyze the selections made by the customer after choices have been made for all of the compartments. The program then may prompt the customer to modify these choices if they result in an overall configuration that is undesirable and/or uneconomic for the product vendor. For, example, if the customer has chosen "SNICKERS®" for every one of the compartments, and it is undesirable for the product vendor to provide a tray with the same brand in every compartment, then the program may prompt the customer to change the selections for a certain number of the compartments.

After the customer has selected the contents of each compartment of the tray, the customer selects the display type that is to be used to hold the tray, e.g., prepack, 4-layer pallet, 4-layer half-pallet, etc. The customer may click on the "clear" button to clear the brand and display selections or the "print" button to print out the information on the screen. Generally, the customer will click on the "view" button to generate the sell sheet page (if the sell sheet has already been generated and no changes have been made on the merchandising unit planning page, then the user may click on the "return" button to view the existing sell sheet page).

As shown in FIGS. 8-11, the program generates a sell sheet that provides a summary of the order. The sell sheet includes images of the merchandising unit containing the selected brands and an image of the display selected to hold the merchandising unit (these images may be formed from bit-mapped images generated from photographs or a line drawing or other graphical representation). These images help the customer to visualize the product.

Figure 8:
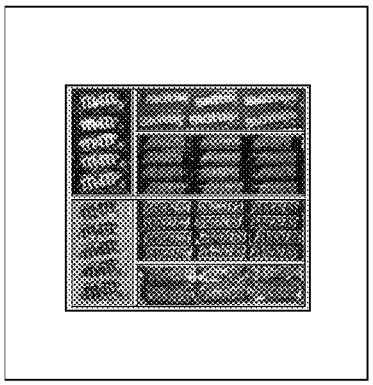
FIG. 8 shows an example of a sell sheet screen that provides product quantity and shipping information and order processing buttons.

As shown in FIG. 8, the customer may return to the merchandising unit planning page by clicking the "return" button. The customer may place the order by clicking the "order" button, which returns the customer to the "Order Detail" section of the merchandising unit planning page to allow entry of the order information, such as quantity and shipping information. The customer may clear the current selections and return to the merchandising unit planning page by clicking the "re-select" button.

Figure 10:
FIG. 10 shows an example of a sell sheet that provides product quantity and shipping information for a full pallet display unit.

FIGS. 9-11 show examples of sell sheets for various types of displays. The sell sheets provide the name of the product and total piece count, along with a Universal Product Code (UPC). This information allows the customer to enter the product and its UPC into the customer's product database. The sell sheet also provides a list of each of the product brands included in the merchandising unit and the quantity and UPC for each. The sell sheet also provides shipping information, such as case size and pallet size. Other information, such as carrier, invoice price, and terms of payment, also may be provided.

The customer-specific merchandising program provides a number of advantages. Many of these advantages stem from allowing the customer to select from a predetermined set of options that are limited according to business or practical considerations. Advantages also stem from the fact that the program can generate a sell sheet upon completion of the product planning process.

For example, because the program is designed to prevent the customer from making selections that are undesirable or uneconomic to the product vendor, the customer can plan and order a product without going through an iterative proposal and approval process with the product vendor. The product vendor, in turn, avoids a similar iterative process with its suppliers, packers, and shippers. The product vendor also avoids having to conduct a project review of the product to determine whether it is economic.

The elimination of these iterative approval processes and project reviews substantially lessens the time between the conception and delivery of the product. In addition, the program provides the customer with greater control over the configuration of the product (without having to contact a sales person) and more flexibility and spontaneity in responding to sales figures and/or new marketing strategies.

As a further example, because the program generates a sell sheet upon completion of the product plan, the customer can enter the product information and UPC into the customer database and plan for receiving and displaying the product well in advance. Alternatively, the program can export the sell sheet data in a format that can be directly imported into the customer's database, e.g., ASCII, Microsoft Word™, Microsoft Excel™, XML, etc. This would prevent errors that arise in secondary entry of information.

Another advantage provided by the customer-specific merchandising program is that it allows packaging to be standardized. Using the program, the customer can select from a number of different product mixes for a particular display configuration. This allows the use of a large quantity of a single product tray design and reduces the need for packaging redesign for each new promotional program, which results in significant cost savings. In addition, the program assures an efficient sizing of the display with respect to the size of a standard pallet and delivery truck. This results in the efficient shipping of the product and prevents underutilization of shipping space and damage resulting from stacking improperly filled pallets.

Although an Internet Web site was described above, the product vendor may make the program available to the customer to run directly on their own computer. The customer's computer then may communicate orders to the product vendor's computer. Alternatively, a sales person for the product vendor may bring portable computer, e.g., a laptop computer or a handheld computer, to the customer's site and allow the customer to run the program. The sales person then may download the order information to the product vendor's centralized sales computer.

Alternatively, the present invention may be implemented using a client server architecture on a network other than the Internet, such as for example a local area network (LAN), a wide area network (WAN), or an intranet.

In addition, the present invention may be implemented as a plurality of hardware/software modules that perform the functions discussed above. The modules may be software components residing in a single computer hardware unit. Alternatively, the modules may be an interconnected group of separate computer hardware/software components.

Other variations and modifications of this invention will be apparent to those skilled in this art after careful study of this application. This invention is not to be limited except as set forth in the following claims.

What is claimed is:

1. A computer-implemented method for facilitating planning and ordering of a merchandising unit and associated products, the method comprising steps of:
   presenting, on a computer screen, a merchandising unit planning screen that displays a representation of a merchandising unit having holders for holding and displaying associated products;
   providing, on the computer screen, a product menu for each holder offering a set of products for the holder;
   constraining, by computer processing, available product choices in the product menu of at least one holder to a subset of the set of products based on predetermined criteria;
   accepting a selection of a product from the available product choices in the product menu of at least one holder;
   determining, by computer processing, for each holder for which a product has been selected, a product quantity based on a capacity of the holder; and
   generating, by computer processing, an order based on the selected products.

2. The method of claim 1, wherein the predetermined criteria include an availability for shipment of each product within a selected time period for the product quantity.

3. The method of claim 1, wherein the predetermined criteria include a profitability of each product for the product quantity.

4. The method of claim 1, wherein the predetermined criteria include a marketing goal for each product.

5. The method of claim 1, wherein the predetermined criteria are established on a customer-specific basis.

6. The method of claim 1, wherein the predetermined criteria are based on geographic sales data.

7. The method of claim 1, further comprising determining a total product quantity for each selected product based on the product quantity for each holder.

8. The method of claim 1, further comprising determining an estimated shipping date for the merchandising unit.

9. The method of claim 1, further comprising generating an image of the merchandising unit having images of the selected products for each respective holder.

10. The method of claim 1, wherein the predetermined criteria include at least one of:
    a prior sales history,
    a business goal, and
    inventory data.

11. A programmed computer system for facilitating planning and ordering of a merchandising unit and associated products, the system comprising a server that includes:
    means for presenting a merchandising unit planning screen that displays a representation of a merchandising unit having holders for holding and displaying associated products;
    means for providing a product menu for each holder offering a set of products for the holder;
    means for constraining available product choices in the product menu of at least one holder to a subset of the set of products based on predetermined criteria;
    means for accepting a selection of a product from the available product choices in the product menu of at least one holder;
    means for determining, for each holder for which a product has been selected, a product quantity based on a capacity of the holder; and
    means for generating an order based on selected products.

12. The programmed computer system of claim 11, wherein the server further includes means for determining a total product quantity for each selected product based on the product quantity for each holder.

13. The programmed computer system of claim 11, wherein the server further includes means for displaying a list of the selected products with a corresponding total product quantity for each selected product.

14. The programmed computer system of claim 11, wherein the server further includes means for generating shipping size and weight information for the merchandising unit.

15. The programmed computer system of claim 11, wherein the server further includes means for generating a sell sheet providing a list of the selected products with a corresponding total product quantity for each selected product, shipping size and weight information for the merchandising unit, and a universal product code.

16. The programmed computer system of claim 15, wherein the server further includes means for exporting sell sheet data for automatic input into a customer database.

17. The programmed computer system of claim 11, wherein the server further includes means for determining an estimated shipping date for the merchandising unit.

18. The programmed computer system of claim 11, wherein the server further includes means for generating a schedule providing a representation of a sales period of the selected products.

19. The programmed computer system of claim 11, wherein the server further includes means for generating an image of the merchandising unit having images of the selected products for each holder.

20. The programmed computer system of claim 19, wherein the server further includes means for generating an image of a display unit showing the merchandising unit positioned in the display unit.

21. The programmed computer system of claim 11, wherein the predetermined criteria include at least one of:
   an availability for shipment of each product within a selected time period for the product quantity,
   a profitability of each product for the product quantity,
   a marketing goal for each product,
   a prior sales history,
   a business goal,
   geographic sales data, and
   inventory data.

22. A non-transitory computer-readable storage medium storing computer code that, when executed by a computer, facilitates planning and ordering of a merchandising unit and associated products, wherein the computer code includes code for:
   presenting a merchandising unit planning screen that displays a representation of a merchandising unit having holders for holding and displaying associated products;
   providing a product menu for each holder offering a set of products for each holder;
   constraining available product choices in the product menu of at least one holder to a subset of the set of products based on predetermined criteria;
   accepting a selection of a product from the available product choices in the product menu of at least one holder;
   determining, for each holder for which a product has been selected, a product quantity based on a capacity of the holder; and
   generating an order based on selected products.

23. The computer-readable storage medium of claim 22, wherein the predetermined criteria include at least one of:
   an availability for shipment of each product within a selected time period for the product quantity,
   a profitability of each product for the product quantity,
   a marketing goal for each product,
   a prior sales history,
   a business goal,
   geographic sales data, and
   inventory data.

* * * * *

UNITED STATES PATENT AND TRADEMARK OFFICE
CERTIFICATE OF CORRECTION

| | | |
|---|---|---|
| PATENT NO. | : 8,036,954 B2 | Page 1 of 1 |
| APPLICATION NO. | : 12/567127 | |
| DATED | : October 11, 2011 | |
| INVENTOR(S) | : Terry Chow | |

It is certified that error appears in the above-identified patent and that said Letters Patent is hereby corrected as shown below:

TITLE PAGE, ITEM [56] REFERENCES CITED

Foreign Patent Documents
"WO WO9515533 A1 6/1995" should read --WO WO95/15533 A1 6/1995--.

COLUMN 4

Line 31, "is" should read --are--.

COLUMN 5

Line 38, "FIG. 4.," should read --FIG. 4,--.

COLUMN 5

Line 43, Close right margin;
Line 44, Close left margin;
Line 53, "an" should read --a--.

Signed and Sealed this
Twenty-seventh Day of March, 2012

David J. Kappos
*Director of the United States Patent and Trademark Office*